Aug. 15, 1972 J. A. PANTAZIS 3,684,612
HEATSEALING APPARATUS
Filed April 2, 1970 2 Sheets-Sheet 1

INVENTOR
JOHN A. PANTAZIS
BY
Cesari and McKenna
ATTORNEYS

Aug. 15, 1972   J. A. PANTAZIS   3,684,612
HEATSEALING APPARATUS
Filed April 2, 1970   2 Sheets-Sheet 2

INVENTOR
JOHN A. PANTAZIS
BY
Cesari and McKenna
ATTORNEYS

United States Patent Office 3,684,612
Patented Aug. 15, 1972

3,684,612
HEATSEALING APPARATUS
John A. Pantazis, 18 Westgate Drive,
Woburn, Mass. 01801
Filed Apr. 2, 1970, Ser. No. 25,280
Int. Cl. B32b 31/18; H05b 7/18
U.S. Cl. 156—251       9 Claims

ABSTRACT OF THE DISCLOSURE

Novel heat generating apparatus, useful in heatsealing plastics and similar applications requiring carefully controlled application of heat to sheet materials, whereby heat from a succession of sparks is dissipated along the surface of superposed plastic sheets. The sheets are mounted for movement between electrodes which are offset from one another, advantageously by a distance of about 0.125 inch or more along the sheet surface.

BACKGROUND OF THE INVENTION

(A) Field of the invention

This invention relates to novel heat-generating apparatus useful in heatsealing thermoplastic sheets and similar applications requiring carefully controlled heating of sheet materials. It also relates to novel processes for which the novel apparatus is used.

(B) The prior art

In recent years, the heatsealing of thermoplastic film has become a common industrial process. Packages formed by heatsealing of films of such polymeric materials such as poly(ethylene) and poly(vinylchloride) can be seen in almost any grocery or department store. In the kind of apparatus presently use to heatseal thermoplastic films, an electrical heating element is usually pressed against two layers of film which are backed by a material having a good thermal conductivity, e.g. an aluminum bar. This type of apparatus does not tend to use energy supplied to it very efficiently. For example, a fair amount of heat is conducted away from the thermoplastic film by the conductive metallic bar. However such a bar is necessary because unless means, such as a metallic bar, is provided to remove heat from the site at which the heatseal is made, overheating of the plastic sheets will often result. And the overheating will result in an excessive amount of machine downtime and in other maintenance problems caused by the formation of unwanted polymeric deposits on the heatsealing apparatus.

U.S. Pat. 3,106,502 to Starger et al. discloses a heatsealing technique which, in special situations, avoids problems associated with excess heating. However the process disclosed by Starger cannot be used to heatseal plastic film without also slicing the heatsealed film along the path of the heatseal. Thus, when utilizing the Starger et al. sealing process for sealing two superposed sheets, two heatseals are formed and the plastic is severed between them. The primary limitations of the Starger process relate to his use of a pair of vertically-spaced electrodes, i.e. electrodes spaced along an imaginary line normal to the direction in which the plastic sheets are moving. The discharge apparently causes formation of holes in the sheets of plastic film to be sealed.

In order to diminish the amount of power required for his operation, Starger et al. suggests the use of some "edge" configuration as a situs for carrying out the process of his invention. Thus, it would presumably take less energy to carry out the concurrent heatsealing and cutting process according to Starger if a line of perforations providing edge configurations were made in the plastic sheet to be sealed and cut.

Processes for electrically perforating polymeric or dielectric sheet material are described in U.S. Pat. 2,763,759 to Mito et al.; U.S. Pat. 2,553,203 to Monty; and U.S. Pat. 2,365,565 to Meaker et al.

There still remains a need for an improved and more versatile heatsealing process whereby good energy efficiency can be obtained during the heatsealing of thermoplastic films without the necessity of cutting the film at the same time and along the same line that the heatseal is being effected.

Apparatus presently used by industry for heatsealing plastic films is limited with respect to its ability to handle more than, say, about 150 feet of film per minute. A consequence of this relatively slow speed is that very valuable packaging apparatus is often operated at speeds much lower than would otherwise be required simply because the supply of heatsealed plastic sheets being supplied thereto cannot be produced any faster than the heatsealing apparatus will permit.

Another problem encountered with conventional heatsealing apparatus is that many plastic sheets, for example those that tend to shrink and those with very sharp melting ranges, cannot be conveniently processed at reasonable line speeds.

SUMMARY OF THE INVENTION

Therefore it is an object of the invention to provide a novel easily controlled heat-applying apparatus for processing of sheet-like materials.

Another object of the invention is to provide an improved heatsealing apparatus capable of performing a spark-actuated heatsealing action which can be closely controlled.

Another object of the invention is to provide apparatus for heatsealing thermoplastic films which apparatus can be operated at extremely high speeds.

Still another object of the invention is to provide a relatively low cost heatsealing apparatus which can be utilized to heatseal even those thermoplastic films which are very difficult or impossible to heatseal with conventional apparatus because of their shrink, or abrupt melting, properties.

A further object of the invention is to provide a heatsealing apparatus which is readily adaptable for use in forming a large number of intricate heatseal designs.

Other objects of the invention will be obvious to those skilled in the art upon reading the instant application.

The above objects have been substantially attained by construction and utilization of an apparatus wherein two superposed layers of thermoplastic film are caused to move relative to carefully positioned electrodes. The electrodes are placed on either side of the plane through which the plastic sheets move; however the electrodes are not in register one with the other and, to the contrary, are offset from one another along the intended path of the heatseal.

When the electrodes are offset from one another, so that an imaginary line drawn from one electrode to another intersects the sheets to be heatsealed at an angle of less than 80 angular degrees, but usually, and, most advantageously, less than about 30 degrees, the spark is caused to travel in close proximity to the plastic along the path between the electrodes. As a result, an excellent distribution of heat energy along the plastic to be sealed can be obtained. This distribution of heat energy allows a smooth heatseal to be achieved without the perforating and puckering problems associated with prior art processes. Most advantageously the lateral offset along the sheets to be heatsealed is at least 0.125 inch.

This geometrical-distribution of heat energy over a space defined by a line along, rather than a line through, the films to be heatsealed is a major factor in the increased efficiency of the process over such processes as disclosed by Starger et al. Moreover, the process of the invention requires no edge configuration as does the Starger et al. process. To the contrary, the process of the invention has extraordinary flexibility with respect to the placement and configuration of heatseals effected therewith.

Another important advantage of the instant invention, an advantage which also tends to increase the efficiency with which the spark energy may be dissipated as heat energy, is the ability to provide a plurality of sparks in series along the line of heatseal. This not only effectively removes the sealing function itself as the limit on the speed at which the machinery can be operated (the first thermoplastic-processing machinery believed to practically achieve such a result), but a machine equipped with means for generating a plurality of sparks in seriatim along the line of heatseal, is also quickly adapted for heatsealing all manner of shrinkable and quick-melting thermoplastic films which have heretofore been considered impractical for heatsealing operations. This utility is primarily due to the control which may be maintained over both the rate at which the film is heated (the rate can be very slow) and the temperature to which the film is heated (the temperature can be regulated so that excess heating is avoided).

Although the apparatus of the invention is described herein with particular attention to its surprising ability to perform heatsealing of thermoplastic sheets, it will be realized by those reading this description that the apparatus also provides a general means for the controlled application of heat from a high voltage source to a web moving in relation to the source. Activation of adhesives, controlled cutting of a plastic so as to leave a suitable edge configuration, and many other utilities will be apparent to those interested in efficiently solving various critical heat control problems.

The two sheets of plastic film need not be in pressured contact one with the other at the time the seal is formed. The sheets are preferably held lightly together to avoid any excessive air gap between the films which could interfere with the formation of a uniformly excellent heatsealing of the sheets. In practice it has been found useful to maintain the area of the sheets being heatsealed between two plates of non-conductive material such as poly-(tetrafluoroethylene) plates or the like. These plates can be arranged as two continuous, moving belts, one on each side of the sheet, when such a configuration will not interfere with carrying out complexed heatseal designs.

The process of the invention can be demonstrated on a small scale by utilization of a small Tesla coil operated at 40,000 to 50,000 volts and 3 to 4 megacycles. The current utilized is about 50 microamps with such a device. Thin steel wires, say of about 0.02 inch diameter, make suitable electrodes. To obtain sufficient heat to operate a process at higher speeds, the generation of more sparks and/or the use of more power is desirable.

Arcs may be used as well as sparks, and "arcs" are considered to be a spark as the term spark is used herein. However, those skilled in the art will realize that high frequency sparks are more desirable because they are more easily controllable in sensitive operations.

A particularly surprising advantage of the invention is its use in sealing plastic sheet which is not perforated and is remote from any edge configuration.

ILLUSTRATIVE EMBODIMENT OF THE INVENTION

In this application and accompanying drawings is shown and described a preferred embodiment of the invention and suggested various alternatives and modifications thereof. It is to be understood that these suggestions are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited to the condition of a particular case.

Figure 1:
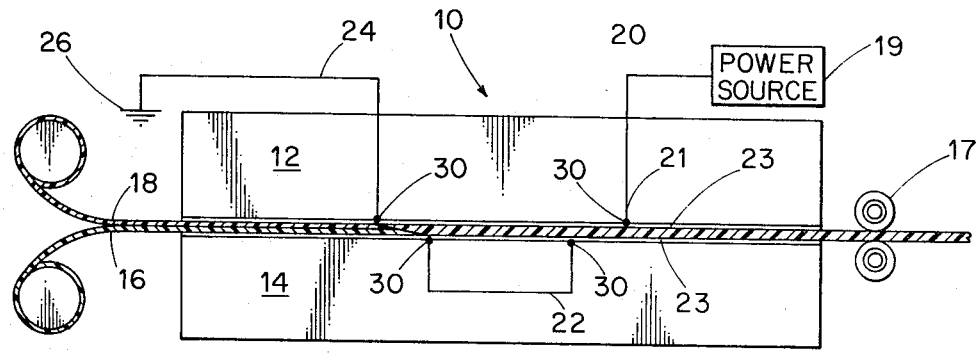
FIG. 1 is a schematic view in elevation of the apparatus of the invention.
Figure 2:
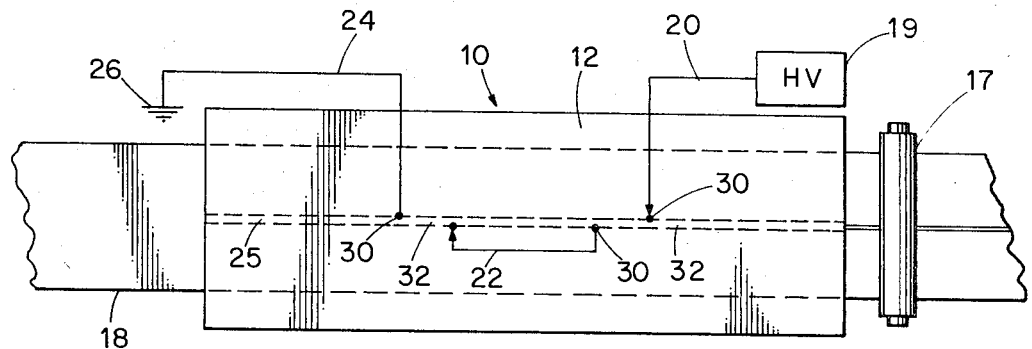
FIG. 2 is a schematic plan view of the apparatus of the invention.

Referring to FIG. 1, it is seen that heatsealing apparatus 10 comprises two opposed plates of non-conducting material, i.e. plates 12 and 14, formed of poly(methylmethacrylate). There is a small gap between upper plate 12 and lower plate 14 through which plastic sheets 16 and 18 are pulled by nip rolls 17.

A first conductor 20 is connected to a high voltage source 19 at one end thereof, and the other end 21 thereof terminates proximate, but spaced from, the top of plastic sheet 18 by a small gap 23. Gap 23 is achieved by cutting a shallow groove 25, in plates 14 and 12, along the intended line of heatseal. A second conductor 22 is embedded in lower plastic plate 14, but is offset by about one-half of one inch from first conductor 20. A third conductor 24 is embedded in upper plate 12 and connected to ground 26. Conductor 24 is placed so there is a gap of about one-half inch between it and the next conductor.

All of the conductors are placed in their respective plastic plates so that the terminals 30 thereof are aligned along a path which is to be congruent with a heatseal formation-zone 32 through which sheets 16 and 18 will be carried. When high voltage source 19 is activated, a continuing series of sparks jumps from terminal 30 of conductor 20. This spark, because of the relatively long distance between the conductors and the minimal air paths in the space between plate 12 and sheet 18, travels primarily along the surface of, but also through, the plastic dissipating energy in the form of heat as it travels.

The spark then enters conductor 22 and again jumps from conductor 22 to conductor 24, once again dissipating heat along the plastic film.

Figure 3:
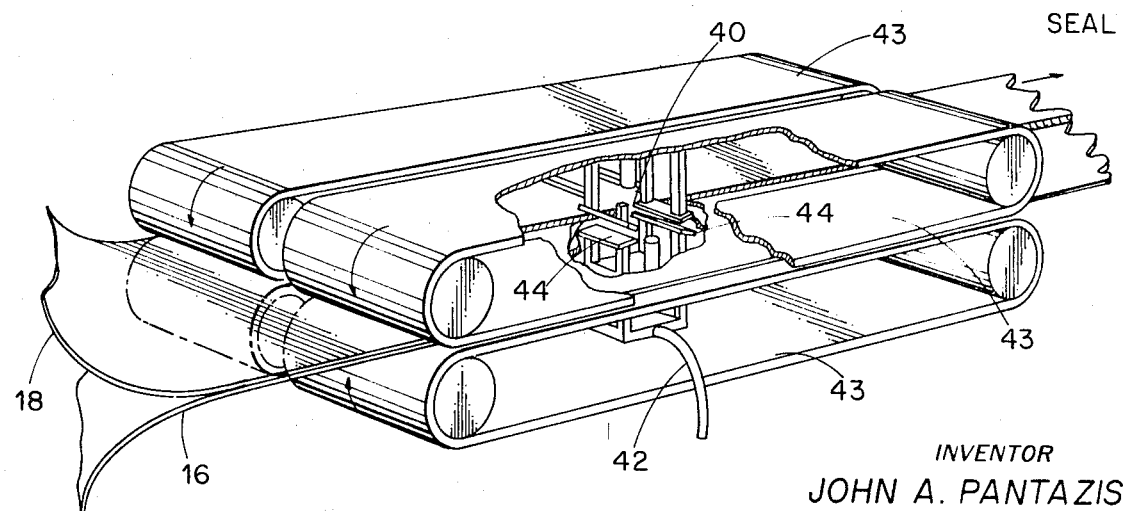
FIG. 3 is a schematic end view, in elevation, another apparatus using a somewhat different construction technique.

FIG. 3 shows an apparatus according to the invention wherein upper electrode assembly 40 and lower electrode assembly 42 are each mounted within two narrow continuously-travelling belts 43. Electrode assemblies 40 and 42 comprise electrodes 43 mounted within spark-guiding guards 44. These guards are formed of a dielectric material and positioned so that the spark discharge point may be brought as close as is possible to achieving a linear path along the film to be sealed.

The apparatus of the invention may be embodied in an indefinite number of forms as may be required for various special purpose applications. Thus, not only can it heatseal sheets along a linear path parallel to the direction of movement of the sheets, but it also can effect heatseals which are transverse (or arranged at any desired angle) to the direction in which the sheets to be sealed can be made to move. For example, if it is desired to convert a flattened tube of plastic film into plastic bags, it is easy to mount the electrodes for movement, back-and-forth and to-and-fro, across the moving tube at such an angle and speed that heatseals are formed at right angles to the plastic tubing.

In fact, of course, the heatseal may be effected at any angle and the movement of the electrodes can even be so programmed that any type of package containing any sequence of sized and shaped heatsealed compartments may be produced utilizing the apparatus.

Variable voltage control, line speed control, or other such means can be utilized to impart more spark energy to the film at selected times and places, thereby severing it, where desired, along the heatseal line to separate the web into distinct bags or packages.

Figure 4:
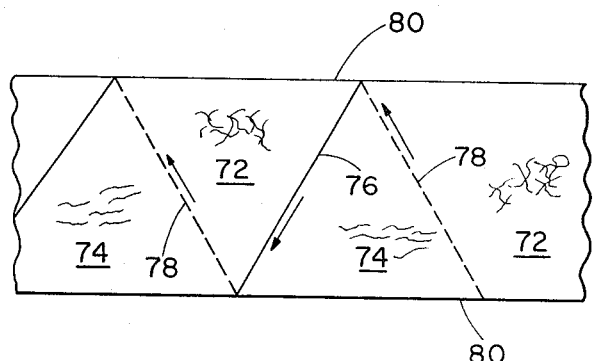
FIG. 4 is a packaging process illustrative of the versatility of the apparatus of the invention.

FIG. 4 is a schematic diagram of one novel packaging scheme achievable with the instant invention. Two superposed sheets of poly(ethylene) comprise, positioned in alternating positions between them, flavoring ingredients 72 and 74. A heatsealing apparatus according to the invention moves back and forth over the two sheets at approximately two times the line speed of the poly(ethylene) sheet. The spark energy is so programmed that it seals the package along heatseal lines 76, but it both seals and cuts along lines 78 so that individual packages are separated from one another. Package boundaries 80 are also heatsealed and cut using apparatus down the packaging line but not shown in FIG. 4. The arrows on FIG. 4 indicate the movement of the electrodes relative to the sheets. The sheets themselves are moved generally left to right across the sheet of drawings.

It should be obvious to those skilled in the art that there is no limit to the heatsealed and/or designs achievable with the instant invention. Circles, figure-eights, ellipses, novelty shapes for toys, and the like can all be achieved by the expedients of regulating the relative speed and/or the relative position of the heatsealing apparatus of the invention to the sheets being processed therethrough.

Figure 5:
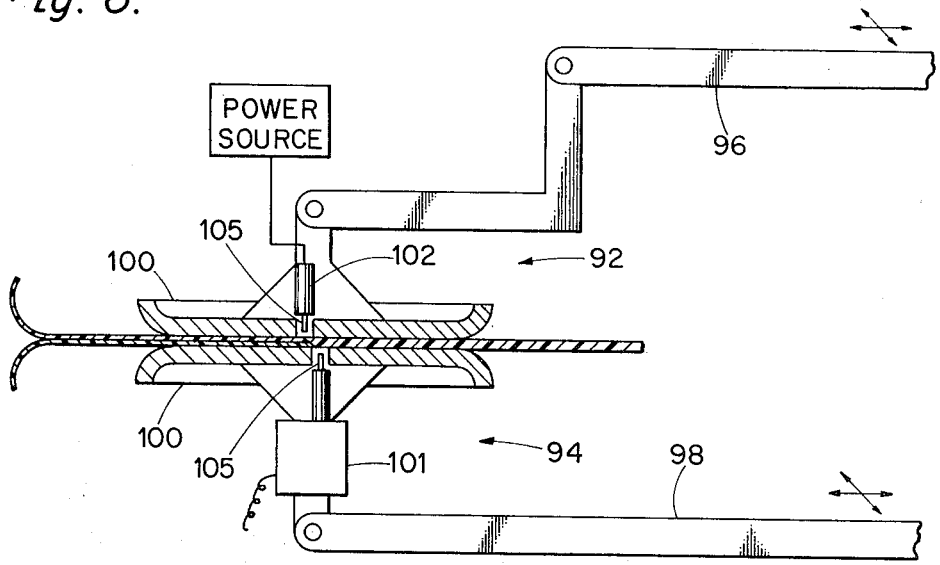
FIG. 5 is a schematic view of the apparatus useful in performing such processes as illustrated by FIG. 4.

FIG. 5 is a schematic diagram of a heatsealing apparatus 90 especially adapted to perform this type of non-linear heatsealing operation.

An upper electrode assembly 92 and a lower electrode assembly 94 are each mounted for programmed movement, back-and-forth, to-and-fro, on booms 96 and 98, respectively. Each electrode assembly comprises a dish-shaped dielectric foot 100 to facilitate and guide the travel of polymer sheet therebetween.

One of foots 100 may be rotatably mounted, as by motor means as seen at 101, for angular movement with respect to the other foot so that the direction of heatseal, i.e. the direction of the imaginary line beween upper electrode 102 and lower electrode 104, can be changed conveniently while keeping the minimum heatseal width. The rotatably mounted foots 100 comprise apertures 105 which provide both access and guide means for controlling the path of the spark discharge between the upper and lower electrodes. The electrodes are, of course, connected to a high voltage source and ground respectively.

Figure 6:
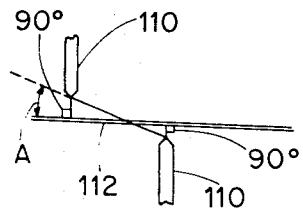
FIG. 6 is a diagram showing the preferred angular relation of the electrodes and sheet passing therebetween.

FIG. 6 illustrates a typical angular relationship of electrodes 110 with respect to sheet material 112 moving therethrough. Angle A is, as advantageous, less than about 30°. In no case should angle A be more than about 80°. Thus it is seen that the electrodes are so placed laterally from one another that an angle A is formed between an imaginary line, running between them and through sheet 112.

It is to be understood that the following claims are intended to cover all of the generic and specific features of the invention herein described.

What is claimed is:

1. In a process for heatsealing thermoplastic film by applying heat to said film by the passage of sparks between a pair of electrodes each of which is mounted on opposite sides of a zone through said film passes, the improvement comprising steps of
   (1) spacing said electrodes laterally along said zone and
   (2) causing sparks to pass along the surface of said film during the movement thereof from electrode to electrode, and
   (3) spacing said electrodes laterally along said zone for a distance effective to avoid cutting said film along the line of heatseal.

2. A process as defined in claim 1 wherein said lateral spacing of said electrodes is at least about 0.125 inch.

3. A process as defined in claim 2 wherein a plurality of said sparks are caused to pass laterally along a predetermined path and from a series of electrodes arranged alternately above and below said heating zone.

4. A process as defined in claim 3 wherein some said sparks are used to preheat said film and some said sparks are used to seal said film along the line of said preheating.

5. A process as defined in claim 3 wherein some said sparks are used to heatseal and some said sparks are used to cut said film along the line of said heatsealing.

6. A process as defined in claim 1 wherein said heatsealing is carried out at speeds in excess of 150 feet per minute.

7. A process as defined in claim 1 wherein said electrodes are moved transversely across the film during said heat-application process.

8. A process as defined in claim 7 wherein a plurality of pairs of electrodes are used and at least one said pair is moved transversely across the film during said heat-application process and at least one pair is maintained in fixed position along said sheet.

9. A process as defined in claim 1 wherein said electrodes are displaced laterally along said zone so that an imaginary line running between them intercepts said film at an angle of less than 80°.

References Cited
UNITED STATES PATENTS

| | | | |
|---|---|---|---|
| 3,537,931 | 11/1970 | Campbell | 156—272 |
| 3,106,502 | 10/1963 | Starger et al. | 156—272 |
| 3,560,291 | 2/1971 | Foglia et al. | 156—272 |
| 3,523,850 | 8/1970 | Uhline | 156—272 |
| 3,483,374 | 12/1969 | Erben | 219—383 |
| 3,355,337 | 11/1967 | Zelnick | 156—272 |
| 3,308,045 | 3/1967 | Sullivan | 219—383 |
| 3,338,693 | 8/1967 | Letter | 156—272 |
| 3,428,782 | 2/1969 | Schmidt | 219—383 |

CARL D. QUARFORTH, Primary Examiner

E. E. LEHMANN, Assistant Examiner

U.S. Cl. X.R.

156—272, 380; 219—383, 384